US011171423B2

(12) United States Patent
Kang et al.

(10) Patent No.: US 11,171,423 B2
(45) Date of Patent: Nov. 9, 2021

(54) META-STRUCTURE HAVING MULTIFUNCTIONAL PROPERTIES AND DEVICE USING THE SAME

(71) Applicants: KOREA INSTITUTE OF MACHINERY & MATERIALS, Daejeon (KR); CENTER FOR ADVANCED META-MATERIALS, Daejeon (KR)

(72) Inventors: Boyoung Kang, Daejeon (KR); Hak Joo Lee, Daejeon (KR); Duckjong Kim, Daejeon (KR); Jae-Hyun Kim, Daejeon (KR)

(73) Assignees: KOREA INSTITUTE OF MACHINERY & MATERIALS, Daejeon (KR); CENTER FOR ADVANCED META-MATERIALS, Daejeon (KR)

( * ) Notice: Subject to any disclaimer, the term of this patent is extended or adjusted under 35 U.S.C. 154(b) by 80 days.

(21) Appl. No.: 16/562,620

(22) Filed: Sep. 6, 2019

(65) Prior Publication Data

US 2020/0144726 A1 May 7, 2020

Related U.S. Application Data

(63) Continuation-in-part of application No. PCT/KR2018/002698, filed on Mar. 7, 2018.

(30) Foreign Application Priority Data

Mar. 7, 2017 (KR) ........................ 10-2017-0028921

(51) Int. Cl.
*H01Q 11/02* (2006.01)
*H01P 1/213* (2006.01)
(Continued)

(52) U.S. Cl.
CPC ............. *H01Q 11/02* (2013.01); *H01P 1/213* (2013.01); *H01Q 15/0006* (2013.01);
(Continued)

(58) Field of Classification Search
CPC ........... H01Q 15/0006; H01Q 15/0013; H01Q 15/0026; H01Q 15/0053; H01Q 15/006;
(Continued)

(56) References Cited

U.S. PATENT DOCUMENTS

| | | | | |
|---|---|---|---|---|
| 8,482,476 | B2 * | 7/2013 | Yanagihara | H01Q 21/06 343/844 |
| 9,742,074 | B2 * | 8/2017 | Liu | H01Q 19/19 |
| 9,923,284 | B1 * | 3/2018 | Loui | H01Q 15/0086 |

FOREIGN PATENT DOCUMENTS

| | | |
|---|---|---|
| CN | 101149296 | 9/2011 |
| CN | 205071428 | 3/2016 |

(Continued)

OTHER PUBLICATIONS

Francesco Monticone et al., "Full Control of Nanoscale Optical Transmission with a Composite Metascreen" Physical Review Letters 110.20 (2013), May 14, 2013.

(Continued)

*Primary Examiner* — Dimary S Lopez Cruz
*Assistant Examiner* — Patrick R Holecek
(74) *Attorney, Agent, or Firm* — Lex IP Meister, PLLC

(57) ABSTRACT

In a meta-structure having multifunctional properties according to an exemplary embodiment of the present invention, a plurality of unit blocks controlling a property of a wave is combined on a plane or in a space in a predetermined pattern to form one structure, at least one of the plurality of unit blocks is formed to have a different size, and a frequency range of a wave controlled is changed according to the size of the unit block.

11 Claims, 14 Drawing Sheets

(51) Int. Cl.
*H01Q 15/00* (2006.01)
*H01Q 17/00* (2006.01)
*H01Q 21/06* (2006.01)
*H04B 3/52* (2006.01)

(52) U.S. Cl.
CPC ......... *H01Q 17/007* (2013.01); *H01Q 21/064* (2013.01); *H04B 3/52* (2013.01)

(58) Field of Classification Search
CPC .... H01Q 15/0086; H01Q 15/02; H01Q 15/08; H01Q 15/10; H01Q 17/007; H01Q 21/064; H01Q 1/36; H01Q 11/02; H01P 1/213; H04B 3/52
See application file for complete search history.

(56) References Cited

FOREIGN PATENT DOCUMENTS

| | | |
|---|---|---|
| JP | 2008-244683 | 10/2008 |
| KR | 10-2012-0038558 | 4/2012 |
| KR | 10-1408306 | 6/2014 |
| KR | 10-1445576 | 10/2014 |

OTHER PUBLICATIONS

EPO, Extended European Search Report of EP 18763065.2 dated Nov. 30, 2020.

* cited by examiner (a)

(b)

(a)

(b)

META-STRUCTURE HAVING MULTIFUNCTIONAL PROPERTIES AND DEVICE USING THE SAME

TECHNICAL FIELD

The present invention relates to a meta-structure having multifunctional properties and a device using the same, and more particularly, to a meta-structure having multifunctional properties, in which unit blocks having different sizes according to a frequency range of a to-be controlled wave are combined in the form of an array, and a device using the same.

BACKGROUND ART

In general, a meta-structure may arbitrarily control characteristics, such as permittivity, permeability, a refractive index, and a scattering parameter, unlike naturally existing atoms or molecules, so that the meta-structure is variously utilized as a new material or structure. Recently, researches on performance improvement and an optimum design of a target object by using the meta-structure have been actively conducted. Particularly, in relation to a technology of controlling energy having a wave form, the meta-structure is utilized as a very significant element.

In the meta-structure, a size of a unit cell, that is a meta atom, configuring the meta-structure is about ⅓ to ⅕ of a wavelength of an incident wave. Only when a size of the meta atom is about ⅓ to ⅕, a specific novel phenomenon, such as negative refractive index, antireflection, and complete absorption, occurs. For reference, the novel phenomenon mainly occurs depending on a resonance phenomenon of a wave, and a response frequency band may be selected according to a geometric characteristic of the meta-structure.

In the meta-structure in the related art, all of the unit cells have the same size, so that there is a problem in that an active frequency range where the novel phenomenon based on resonance occurs is relatively narrow.. That is, it is possible to selectively control only the waves of a specific frequency corresponding to the size of the unit cell, but it is impossible to control the wave outside the specific frequency.

The meta-structure has been applied in various technical fields, such as a resonator, a current filter, a sensor, a polarizer, an energy harvester, and an antenna, since the meta-structure was proposed in the early 2000's, and fields, to which the meta-structure is applied, are gradually increasing. Further, a frequency range of a wave to be controlled here is also diversified and broader.

Accordingly, a meta-structure, which is capable of controlling a wave having a broadband at the same time, has been demanded.

DISCLOSURE

Technical Problem

The present invention has been made in an effort to provide a meta-structure having multifunctional properties, which is capable of controlling a wave having a broadband at the same time and has a more stable structure, and a device using the same.

Technical Solution

An exemplary embodiment of the present invention provides a meta-structure having multifunctional properties, in which a plurality of unit blocks controlling a property of a wave is arranged on a plane or in a space in a predetermined pattern to form one structure, at least one of the plurality of unit blocks is formed to have a different size, and a frequency range of a wave controlled is changed according to the size of each of the plurality of unit blocks.

The plurality of unit blocks may be disposed on a plane, and the size of each of the plurality of unit blocks may be continuously increased according to the Fibonacci Sequence rules.

The plurality of unit blocks may be disposed in a space, each of the plurality of unit blocks may be formed in a cuboid shape in which one surface is shaped like a square, and a length of one side of each of the plurality of unit blocks may be continuously increased according to the Fibonacci Sequence rules.

The unit blocks may be disposed so that one side of the $n^{th}$ unit block among the unit blocks is in contact with one side of the $n\text{-}1^{th}$ unit block.

The plurality of unit blocks may be disposed on a plane, and the size of each of the plurality of unit blocks may be intermittently increased according to the Fibonacci Sequence rules.

The plurality of unit blocks may be disposed in a space, each of the plurality of unit blocks may be formed in a cuboid shape in which one surface is shaped like a square, and a length of one side of each of the plurality of unit blocks may be intermittently increased according to the Fibonacci Sequence rules.

The unit block, of which a length of one side is a first length, among the plurality of unit blocks may control a property of an electromagnetic wave having a first frequency, and the unit block, of which a length of one side is a second length that is smaller than the first length, among the plurality of unit blocks may control a property of an electromagnetic wave having a second frequency that is higher than the first frequency.

The unit block, of which a length of one side is a first length, among the plurality of unit blocks may control a property of a mechanical wave having a first frequency, and the unit block, of which a length of one side is a second length that is smaller than the first length, among the plurality of unit blocks may control a property of a mechanical wave having a second frequency that is higher than the first frequency.

The plurality of unit blocks may be disposed on a plane, each of the plurality of unit blocks may be formed in a wire shape, and the plurality of unit blocks may be arranged side by side at a predetermined interval, and a width of each of the plurality of unit blocks may be continuously increased according to the Fibonacci Sequence rules.

The plurality of unit blocks may be disposed on a plane, each of the plurality of unit blocks may be formed in a wire shape, and the plurality of unit blocks may be arranged side by side at a predetermined interval, and a width of each of the plurality of unit blocks may be intermittently increased according to the Fibonacci Sequence rules.

Another exemplary embodiment of the present invention provides a device using a meta-structure having multifunctional properties, the device including: the meta-structure; and a shape fixing frame coupled to an edge of the meta-structure and configured to fix the meta-structure.

Advantageous Effects

According to the exemplary embodiment of the present invention, it is possible to control waves of a broadband with the single meta-structure.

Further, according to the exemplary embodiment of the present invention, it is possible to obtain advantageous effects, such as efficient blocking of electromagnetic waves harmful to a human body, multi-channel and high-speed data communication, and miniaturization of optical or current filters, and it is possible to diversify the function of the meta-structure by controlling heterogeneous waves having different frequency bands.

Further, according to the exemplary embodiment of the present invention, it is possible to minimize a size of the meta-structure by arranging the maximum number of unit blocks in a limited area or space, and it is possible to stably enlarge the size of the meta-structure.

Further, according to the exemplary embodiment of the present invention, the present invention is applied to a polarizer of a liquid crystal display device to optimize a display of white light.

BEST MODE FOR INVENTION

Figure 1:
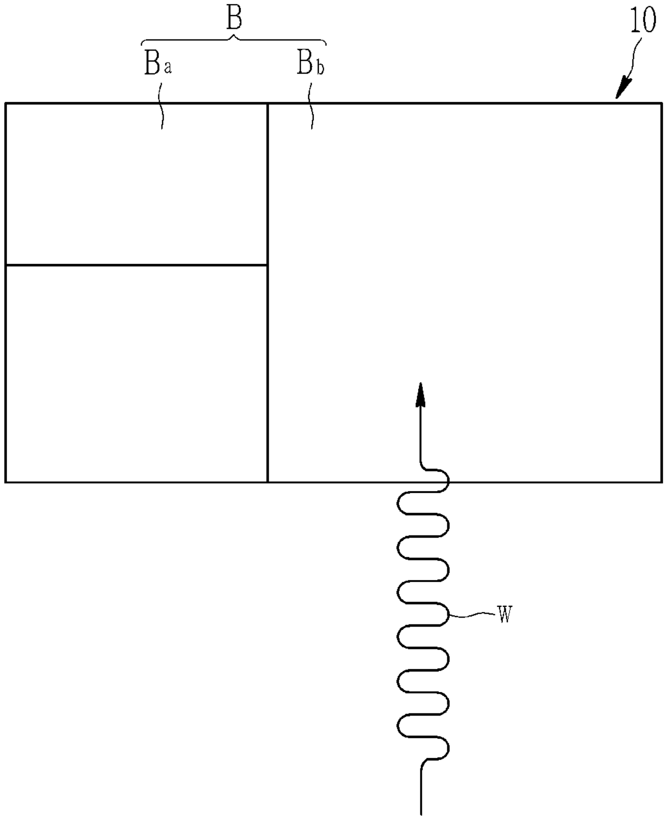
FIG. 1 is a diagram schematically illustrating a meta-structure having multifunctional properties according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present invention is not limited thereto.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, an exemplary embodiment of a meta-structure having multifunctional properties according to the present invention will be described in detail with reference to the accompanying drawings.

Figure 2:
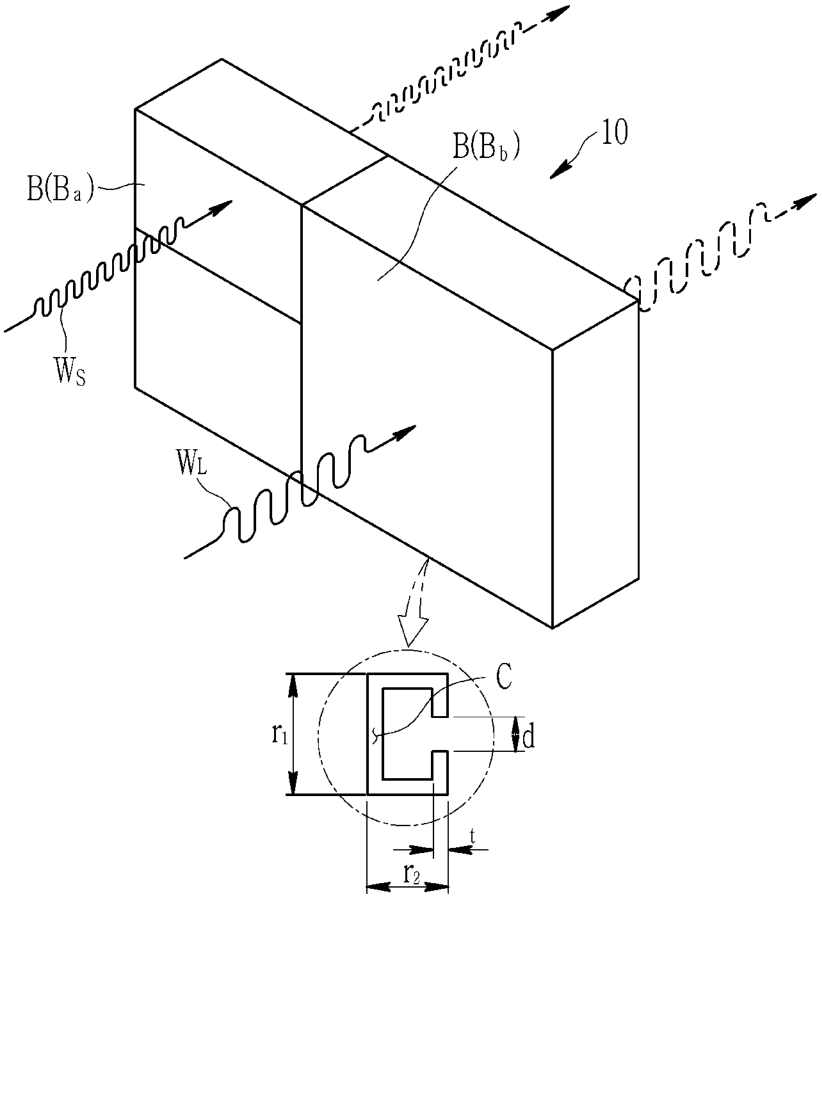
FIG. 2 is a diagram illustrating the case where properties of waves having different frequencies are changed by respective unit blocks configuring the meta-structure having the multifunctional properties of FIG. 1.

FIG. 1 is a diagram schematically illustrating a meta-structure having multifunctional properties according to an exemplary embodiment of the present invention, and FIG. 2 is a diagram illustrating the case where properties of waves having different frequencies are changed by respective unit blocks configuring the meta-structure having the multifunctional properties of FIG. 1.

Referring to FIGS. 1 and 2, a meta-structure 10 having multifunctional properties according to an exemplary embodiment of the present invention is a structure in which a plurality of unit blocks B having different sizes according to a frequency range of a to-be-controlled wave W is combined in the form of an array, and the plurality of unit blocks B having a property for artificially controlling the property of the wave W is combined in a predetermined pattern on a plane or a space to form one meta-structure 10.

The plurality of unit blocks B is formed to have different sizes. A unit cell C designed to have a specific shape is disposed inside the unit block B as illustrated in FIG. 2, and for example, a single or a plurality of unit cells C may be disposed on a surface perpendicular to a direction, in which the wave W is incident, in the unit block B.

The single or the plurality of unit cells C may have a property of controlling a property of the wave W when the wave W passes through, and accordingly, the unit block B may have a property of controlling the property of the wave W. FIG. 2 illustrates the unit cell C having the illustrative form, and a conversion characteristic of the wave W is varied according to a thickness t, an opening width d, a vertical length $r_1$, or a horizontal length $r_2$, and the like of the unit cell C. For example, the unit cell C may allow an incident wave to permeate, absorb, reflect, scatter, and diffract the incident wave according to a geometric shape thereof, so that the unit cell C may have various shapes according to the purpose of use. Accordingly, in the respective unit blocks B, the shapes of the unit cells C disposed therein may also be the same as each other or different from each other.

The size of the unit cell C may be increased or decreased in proportion to the size of the unit block B, and the controlled frequency range of the wave W is changed according to the size of the unit block B. In this case, the geometric shape of the unit cell C is maintained as it is, so that the conversion characteristic of the wave W follows a predetermined pattern or rule.

That is, the characteristic (for example, a refractive index) of the wave W is controlled according to a predetermined pattern while a wave $W_s$ which has a relatively high frequency among the waves W incident to the meta-structure 10 reacts to a unit block $B_a$ corresponding to the wave $W_s$, and the characteristic of the wave W is controlled according to a predetermined pattern while a wave $W_L$ which has a relatively low frequency among the waves W incident to the meta-structure 10 reacts to a unit block $B_b$ corresponding to the wave $W_L$.

Recently, as the electric/electronic technology, such as mobile communication, has been developed, a frequency band of the wave W to be controlled is becoming wider, but in the meta-structure in the related art, all of the unit cells have the same size, so that a frequency range in which the meta phenomenon occurs is relatively narrow.

In the meantime, in the present invention, the unit blocks B configuring one meta-structure 10 have various sizes, and the sizes of the unit cells are various according to the sizes of the unit block B, so that it is possible to more extensively control the frequency range of the wave W.

The shape of the unit block B is not particularly limited, but in the present exemplary embodiment, one surface, for example, the surface facing the wave W, of the unit block B may be formed in a rectangular shape, and the unit block B may be formed in a shape of a rectangular pillar or a cuboid.

Figure 3:
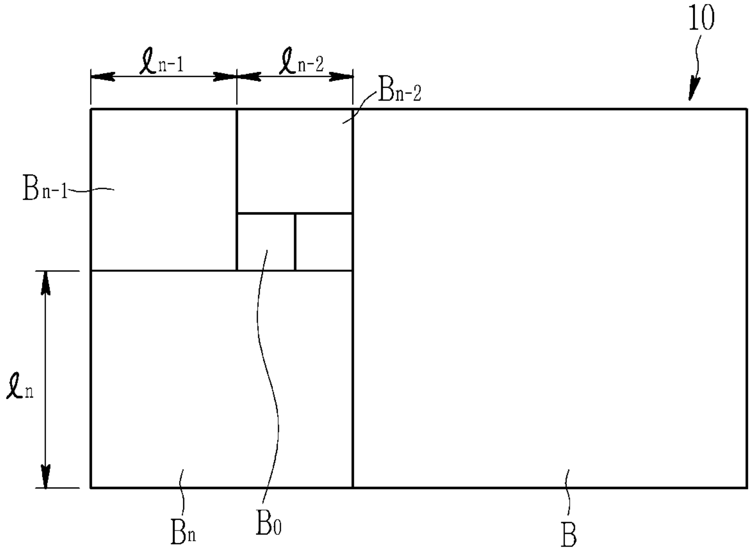
FIG. 3 is a diagram illustrating the case where a length of each unit block configuring the meta-structure having the multifunctional properties according to the exemplary embodiment of the present invention is increased according to the Fibonacci Sequence rules.

FIG. 3 is a diagram illustrating the case where a length of each unit block configuring the meta-structure having the multifunctional properties according to the exemplary embodiment of the present invention is increased according to the Fibonacci Sequence rules. Herein, FIG. 3 illustrates the meta-structure having the multifunctional properties according to the exemplary embodiment of the present invention viewed from the front side. Further, FIG. 4 is a diagram illustrating the case where properties of electromagnetic waves having different frequencies are changed by respective unit blocks configuring the meta-structure having the multifunctional properties of FIG. 3, and FIG. 5 is a diagram illustrating the case where properties of mechanical waves having different frequencies are changed by respective unit blocks configuring the meta-structure having the multifunctional properties of FIG. 3.

Figure 4:
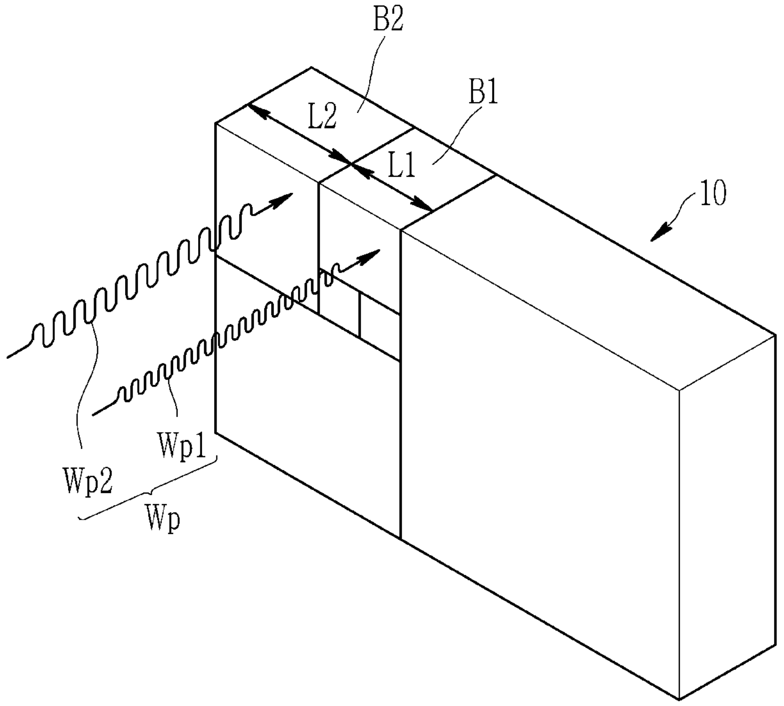
FIG. 4 is a diagram illustrating the case where properties of electromagnetic waves having different frequencies are changed by respective unit blocks configuring the meta-structure having the multifunctional properties of FIG. 3.
Figure 5:
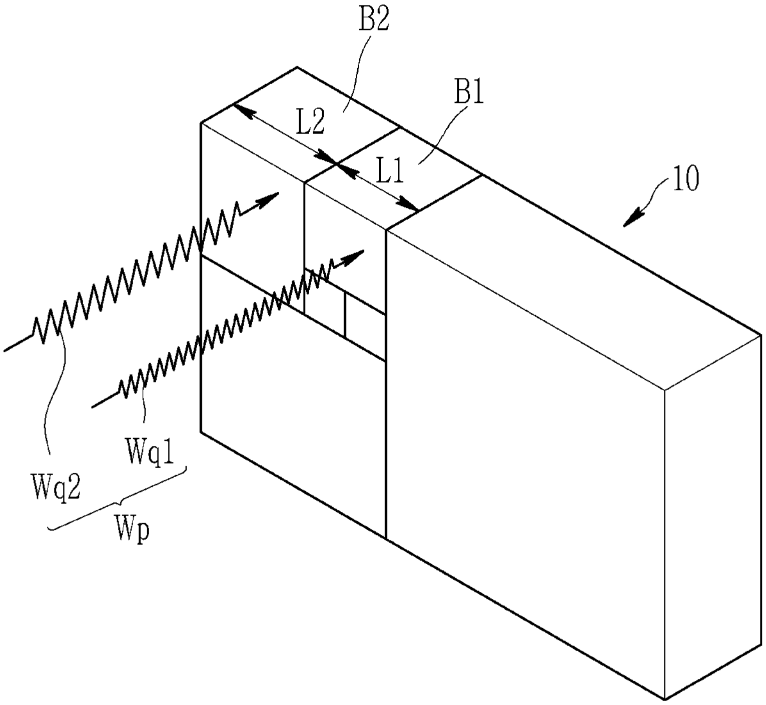
FIG. 5 is a diagram illustrating the case where properties of mechanical waves having different frequencies are changed by respective unit blocks configuring the meta-structure having the multifunctional properties of FIG. 3.

As illustrated in FIGS. 3 to 5, according to the exemplary embodiment of the present invention, the unit block B is formed in a cuboid, in which one surface facing the wave W, more particularly, a surface perpendicular to a direction, in which the wave W is incident, has a square shape, and a length of one side a front surface, that is, the square, facing the wave W of the unit block is increased according to the Fibonacci Sequence rules, and the unit blocks B are disposed so that one side $I_n$ of the $n^{th}$ unit block $B_n$ among the unit blocks B is in contact with one side of the n-$1^{th}$ unit block $B_{n-1}$.

In the present specification, "one surface" of the unit block means the front surface facing the wave or the surface perpendicular to the direction, in which the wave W is incident, and "one side" of the unit block means one side of one surface shaped like a square in the unit block.

The Fibonacci Sequence is known as a sequence made by setting first two terms as 1 and 1, and then adding the previous two terms from the next term, and in the present exemplary embodiment, the meta-structure 10 is formed in a spiral form with the first unit block $B_0$ as a starting point, and as the number of unit blocks B is increased, an aspect ratio of the meta-structure 10 converges to the golden ratio (about 1.618).

When the spiral is drawn according to the Fibonacci Sequence rules, the most dense spiral may be made, so that it is possible to minimize the size of the meta-structure 10 by arranging as many unit blocks B as possible in a limited area, and it is possible to stably increase the size of the meta-structure 10 by combining the unit blocks B, of which the square shapes are enlarged in a predetermined magnification, in the spiral form.

In the meantime, the wave W may include a mechanical wave Wq, such as a water wave, a sound wave, a seismic wave, and an elastic wave, transmitted through the movement of particles in the medium, an electromagnetic wave Wp, such as visible ray, infrared ray, ultraviolet ray, broadcast wave, and X-ray, transmitted by waves of electric and magnetic fields irrelevantly to the medium, or the like. The electromagnetic wave Wp generally has a frequency band from radio waves (kHZ to THZ) to light waves (IR to UV bands), and the mechanical wave Wp has a relatively lower frequency band than that of the electromagnetic wave Wp. The present invention is the independent structure designed in the specific pattern, and is particularly useful for controlling the general electromagnetic wave that is irrelevant to the medium, and the broadband electromagnetic wave from far infrared ray to visible ray.

In the exemplary embodiment of the present invention, as illustrated in FIG. 4, the unit block B1 of which a length of one side is a first length L1 among the plurality of unit blocks B configuring the meta-structure 10 may control a property of an electromagnetic wave Wp1 having a first frequency, and the unit block B2 of which a length of one side is a second length L2 that is larger than the first length L1 may control a property of an electromagnetic wave Wp2 having a second frequency that is lower than the first frequency.

Otherwise, as illustrated in FIG. 5, the unit block B1 of which a length of one side is a first length L1 among the plurality of unit blocks B may control a property of a mechanical wave Wp1 having a first frequency, and the unit block B2 of which a length of one side is a second length L2 that is larger than the first length L1 may control a property of a mechanical wave Wp2 having a second frequency that is lower than the first frequency.

As described above, the present invention may control the waves W of the broadband by using the single meta-structure 10, so that it is possible to obtain advantageous effects, such as efficient blocking of electromagnetic waves harmful to a human body, multi-channel and high-speed data communication, and miniaturization of optical or current filters, and the present invention may also diversify the function of the meta-structure 10 by controlling the heterogeneous waves W having different frequency bands.

FIGS. 3 to 5 are illustrated based on the case where the unit blocks B are disposed on the plane and the unit block B is formed in the cuboid in which one surface of the unit block B is the square as the example, but the present invention is not limited thereto, and the unit blocks are disposed in a space and each unit block may also be formed in a shape of a cuboid or a cube.

Figure 6:
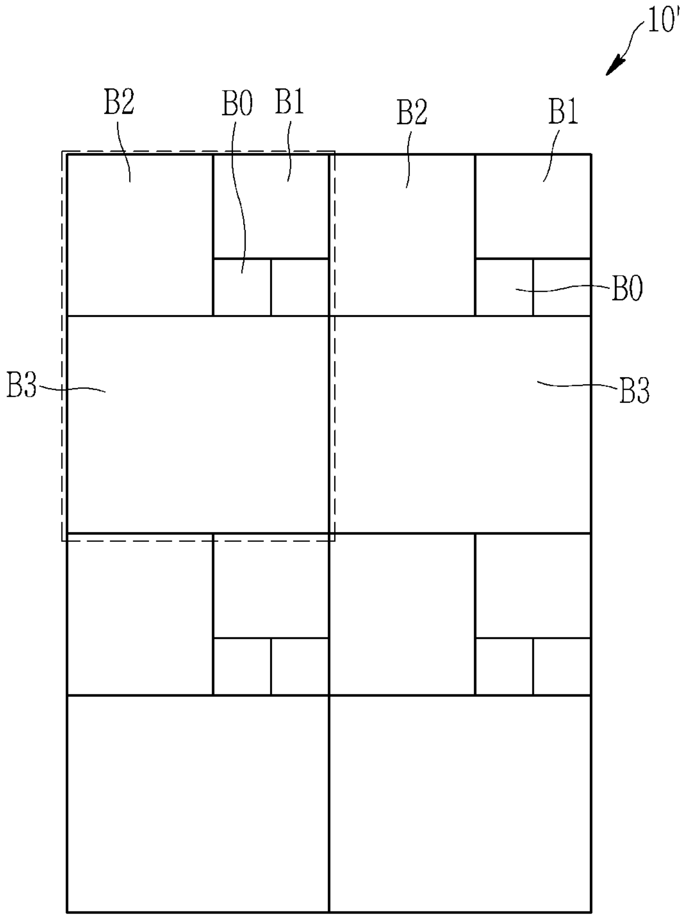
FIG. 6 is a diagram illustrating a modified example in which a plurality of unit blocks is arranged in the meta-structure having the multifunctional properties of FIG. 3.

In the meantime, FIG. 6 is a diagram illustrating a modified example in which a plurality of unit blocks is arranged in the meta-structure having the multifunctional properties of FIG. 3.

The meta-structure 10 of FIG. 3 is illustrated as consisting of the unit blocks B whose lengths of one side is continuously increased according to the Fibonacci Sequence, but as illustrated in FIG. 6, unit blocks B0, B1, B2, and B3 whose lengths of one side is increased according to the Fibonacci Sequence are collected by a predetermined amount to form one set, and a meta-structure 10' including the plurality of sets may also be configured.

Figure 7:
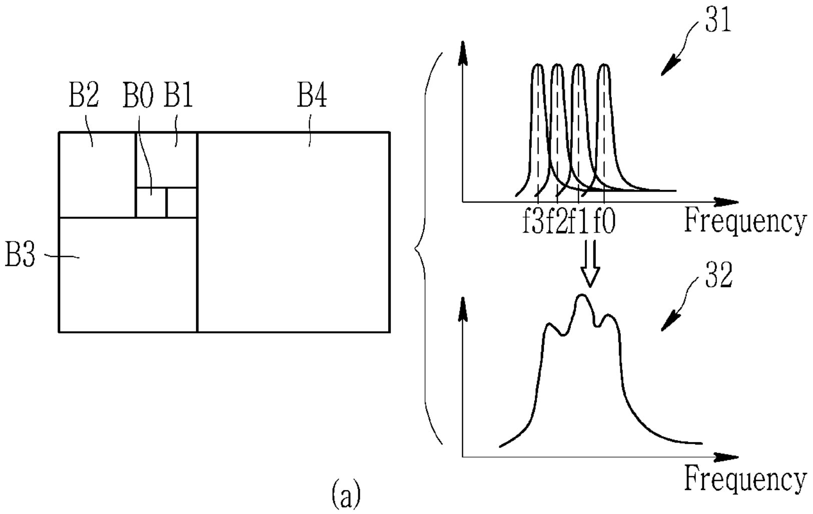
FIG. 7 is a diagram illustrating a form in which a length of each unit block is continuously increased and a form in which a length of each unit block is discontinuously increased according to the Fibonacci Sequence rules in the meta-structure having the multifunctional properties of FIG. 3.
Figure 7:
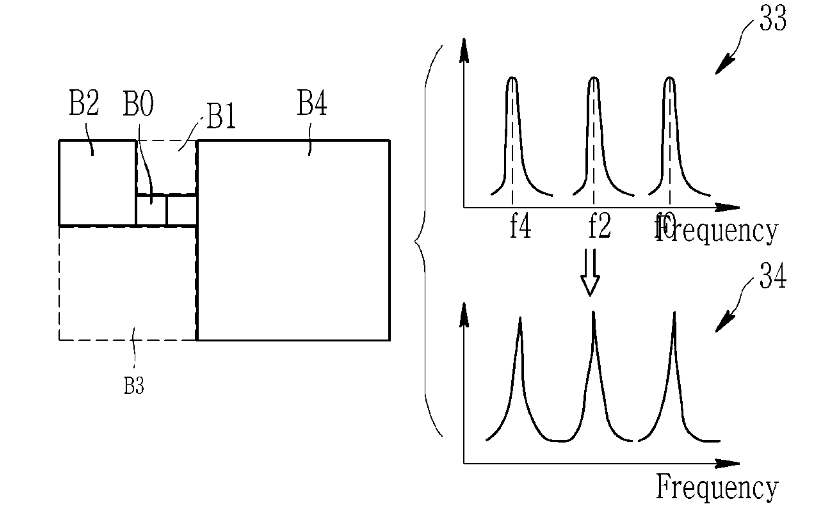

In the meantime, FIG. 7 is a diagram illustrating a form in which a length of each unit block is continuously increased and a form in which a length of each unit block is discontinuously increased according to the Fibonacci Sequence rules in the meta-structure having the multifunctional properties of FIG. 3.

As illustrated in (a) of FIG. 7, the meta-structure 10 may consist of the plurality of unit blocks B0, B1, B2, B3, and B4 whose lengths of one side are continuously increased according to the Fibonacci Sequence rules.

Resonant frequencies 31 of the unit blocks B0, B1, B2, and B3 are f0, f1, f2, and f3, respectively, and when the size difference between the neighboring unit blocks B0, B1, B2, and B3 is not large, the interval between the neighboring resonant frequencies may also be narrowed.

In this case, when the meta-structure 10 is configured by continuously arranging the plurality of unit blocks B0, B1, B2, and B3 whose sizes are continuously increased according to the Fibonacci Sequence rules, an overlapping phenomenon occurs between the resonant frequency f0 of the unit block indicated with B0, the resonant frequency f1 of the unit block indicated with B1, the resonant frequency f2 of the unit block indicated with B2, and the resonant frequency f3 of the unit block indicated with B3, so that a resonant frequency 32 of the entire meta-structure 10 may have a broad band width. The meta-structure 10 formed as described above has the broad band width, so that the meta-structure 10 may be applied as a broad band filter and the like.

As illustrated in (b) of FIG. 7, the meta-structure 10 may consist of the plurality of unit blocks B0, B2, and B4 whose lengths of one side are discontinuously increased according to the Fibonacci Sequence rules. Otherwise, although not illustrated in the drawing, the meta-structure 10 may consist of the plurality of unit blocks in which the case where the lengths of one side of the unit blocks are continuously increased is combined with the case where the lengths of one side of the unit blocks are discontinuously increased according to the Fibonacci Sequence rules.

Referring to (b) of FIG. 7, resonant frequencies 33 of the unit blocks B0, B2, and B4 (herein, there are no unit blocks corresponding to B1 and B3) are f0, f2, and f4, respectively, and when the size difference between the unit blocks B0, B2, and B4 is relatively large, the interval between the neighboring resonant frequencies may also be broad.

In this case, when the meta-structure 10 is formed of the plurality of unit blocks B0, B2, and B4 formed in the sizes corresponding to the first term (or the second term: corresponding to the size of 1 in the Fibonacci Sequence), the fourth term (corresponding to the size of 3, and the sixth term (corresponding to the size of 8 in the Fibonacci Sequence of the Fibonacci Sequence (1, 1, 2, 3, 5, 8, . . . ), the resonant frequency f0 of the unit block indicated with B0, the resonant frequency f2 of the unit block indicated with B2, and the resonant frequency f4 of the unit block indicated with B2 do not influence different frequencies, so that a resonance phenomenon may occur at various discrete frequencies. The meta-structure 10 formed as described above has a narrow band width and the plurality of discrete resonant frequencies 34, so that the meta-structure 10 may be applied as a multiple filter array and the like.

In the present specification, "the length of one side of the plurality of unit blocks B is "discontinuously" increased" means that in the Fibonacci Sequence, the size is formed by skipping at least one term like the case where, for example, the plurality of unit blocks B is formed with the sizes corresponding to the first term (corresponding to the size of 1 in the Fibonacci Sequence), the fourth term (corresponding to the size of 3 in the Fibonacci Sequence, and the sixth term (corresponding to the size of 8 in the Fibonacci Sequence of the Fibonacci Sequence.

Further, in the present specification, "the length of one side of the plurality of unit blocks is "intermittently" increased according to the Fibonacci Sequence" means the case where the length of one side of the plurality of unit blocks is discontinuously increased according to the Fibonacci Sequence and also means the combination of the case where the length of one side of the plurality of unit blocks is continuously increased and the case where the length of one side of the plurality of unit blocks is discontinuously increased. For example, like the case where the plurality of unit blocks B is formed with the sizes corresponding to the first term (corresponding to the size of 1 in the Fibonacci Sequence), the fourth term (corresponding to the size of 3 in the Fibonacci Sequence, and the fifth term (corresponding to the size of 5 in the Fibonacci Sequence) of the Fibonacci Sequence, "the length of one side of the plurality of unit blocks is "intermittently" increased according to the Fibonacci Sequence" means the combination of the cases where in the Fibonacci Sequence, the size is formed by skipping at least one term (the first term and the fourth term) and the size is continuously formed (the fourth term and the fifth term).

Hereinafter, the form in which the length of one side of the plurality of unit blocks configuring the meta-structure is continuously increased according to the Fibonacci Sequence rules and the form in which the length of one side of the plurality of unit blocks configuring the meta-structure is intermittently increased will be compared through a simulation calculation result.

Figure 8:
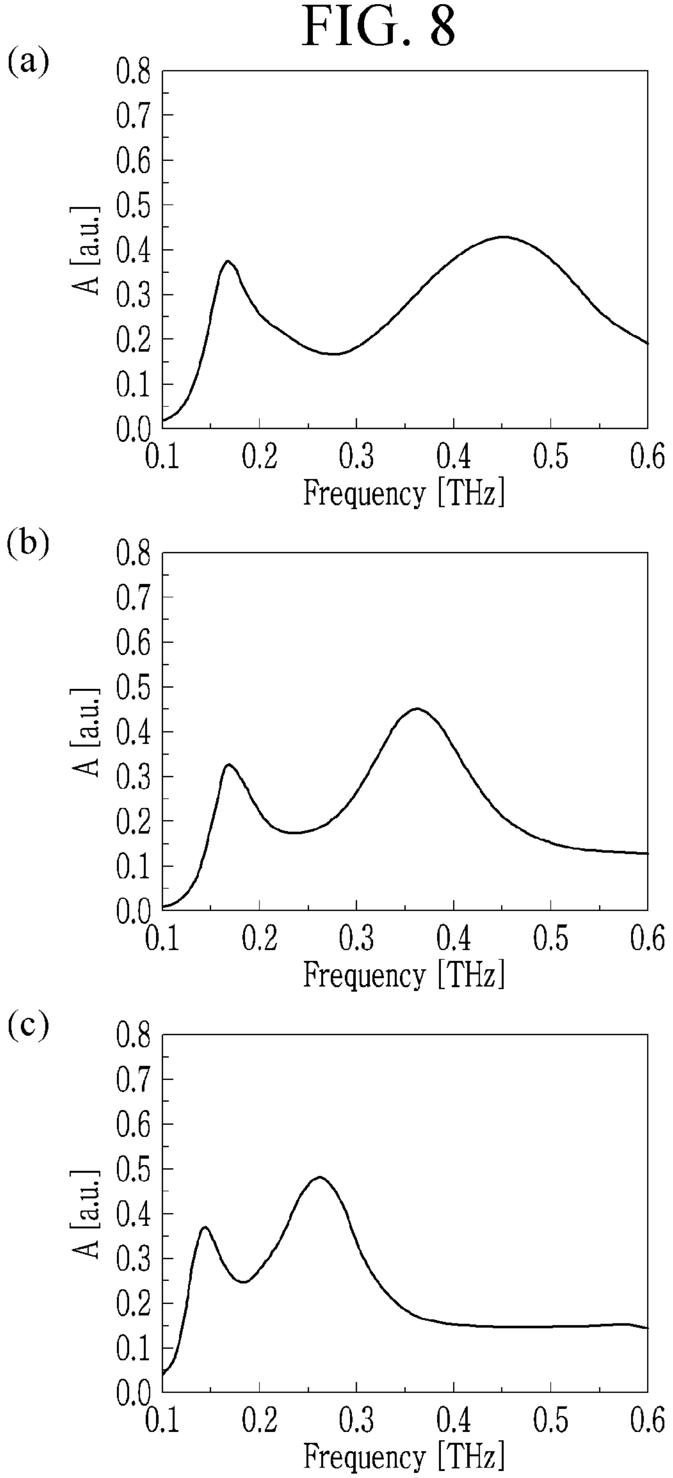
FIGS. 8 and 9 are graphs illustrating simulation calculation results for comparing an absorbance for a frequency between the meta-structure having the form in which a length of each unit block is continuously increased and the meta-structure having the form in which a length of each unit block is intermittently increased according to the Fibonacci Sequence rules.
Figure 9:
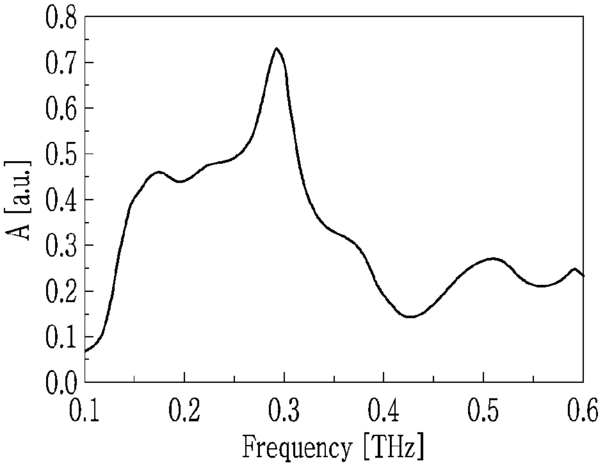
Figure 9:
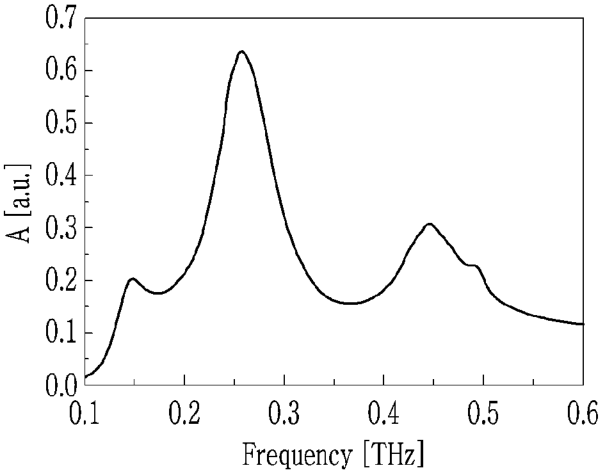

FIGS. 8 and 9 are graphs illustrating simulation calculation results for comparing an absorbance according to a frequency between the meta-structure having the form in which a length of each unit block is continuously increased and the meta-structure having the form in which a length of each unit block is intermittently increased according to Fibonacci Sequence rules. FIG. 8 is a graph illustrating simulation calculation results of absorbance of the frequencies of three unit blocks B1, B2, and B3 configuring the meta-structure used in the simulation, (a) of FIG. 9 is a graph illustrating simulation calculation results of absorbance according to the frequencies of the meta-structure in which three unit blocks B1, B2, and B3 are continuously arranged, and (b) of FIG. 9 is a graph illustrating simulation calculation results of absorbance according to the frequencies of the meta-structure in which one unit block B1 among the three unit blocks B1, B2, and B3 is omitted. In the graphs of FIG.

8 and (a) and (b) of FIG. 9, the x-axis commonly represents a frequency and the y-axis commonly represents an absorbance.

Referring to FIG. 8, the meta-structure used in the simulation consists of the three unit blocks B1, B2, and B3 of which lengths of one side are 60 m, 90 m, and 150 m, respectively, and has a peak value of the absorbance at the resonant frequency of each of the unit blocks.

(a) of FIG. 9 represents the simulation calculation result of the meta-structure in which the three unit blocks B1, B2, and B3 are continuously arranged, and it can be seen that an absorbance of 0.4 or more is represented at a bandwidth of 0.1 to 0.4 THz. That is, a coupling phenomenon occurs between the three continuously arranged unit blocks B1, B2, and B3, so that the meta-structure has a high absorbance in a broad frequency band.

(b) of FIG. 9 represents the simulation calculation result of the meta-structure in which the three unit blocks B1, B2, and B3 are not continuously arranged and one unit block B2 is omitted, and it can be seen that an absorbance is high in the vicinity of each of 0.18 THz, 0.25 THz, and 0.45 THz. That is, compared to the result of (a) of FIG. 9, an influence of the unit block B2 omitted in the meta-structure is not exhibited, and the unit block does not influence different frequencies between the discontinuously arranged unit blocks, so that the meta-structure has a high absorbance at various discrete frequencies.

The characteristic of (a) of FIG. 9 may be applied as a broadband filter, and the characteristic of (b) of FIG. 9 may be applied as a narrow band filter or a material detecting sensor.

Figure 10:
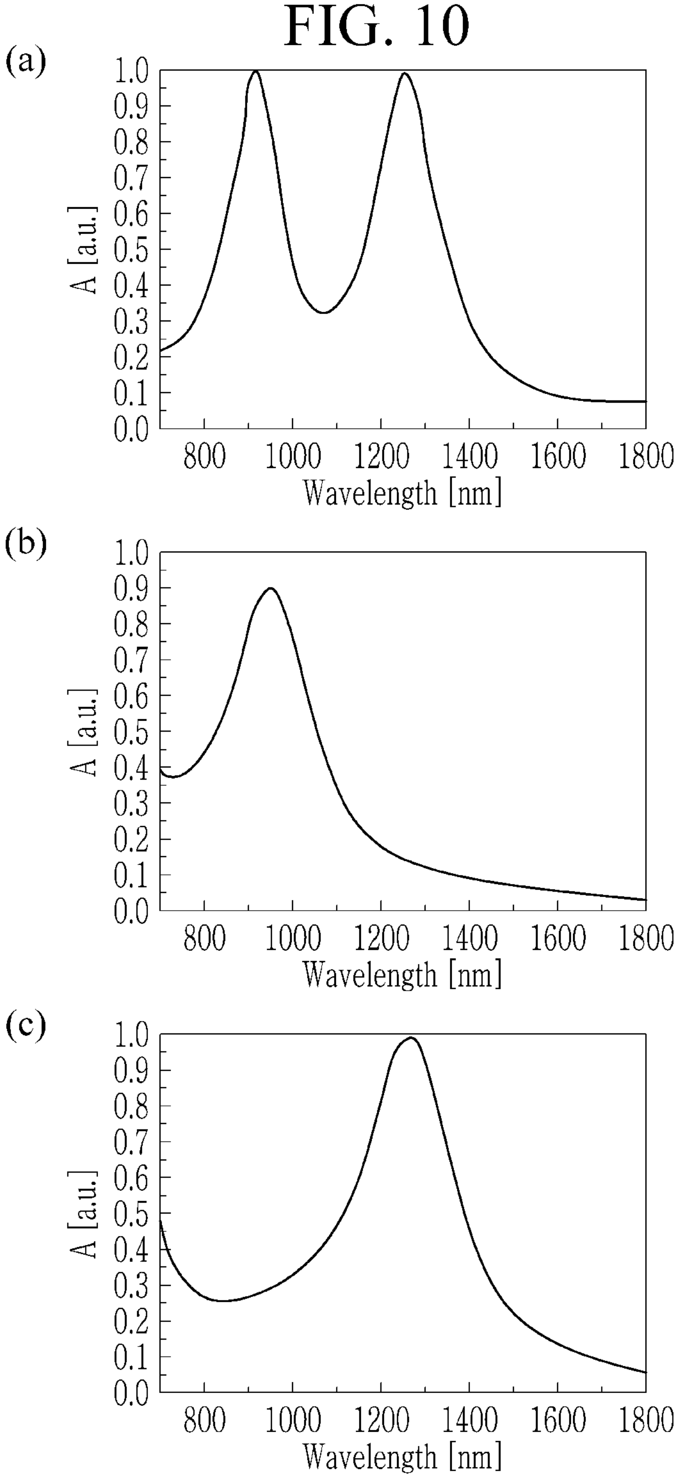
FIG. 10 is a graph illustrating a calculation result of a simulation of an absorbance of the meta-structure in which unit blocks having a resonant frequency of a different band from those of FIGS. 8 and 9 are arranged.

FIG. 10 is a graph illustrating a simulation result of an absorbance of the meta-structure in which unit blocks having a resonant frequency of a different band from those of FIGS. 8 and 9 are arranged.

(a) of FIG. 10 is a graph illustrating a simulation result of an absorbance according to a wavelength of the meta-structure in which two unit blocks B2 and B3 are continuously arranged, (b) of FIG. 10 is a graph illustrating a result of a simulation of an absorbance according to a wavelength of the unit block B2 among the unit blocks B2 and B3 configuring the meta-structure used in the simulation of (a) of FIG. 10, and (c) of FIG. 10 illustrates a calculation result of a simulation of an absorbance according to a wavelength of the unit block B3 among the unit blocks B2 and B3 configuring the meta-structure used in the simulation of (a) of FIG. 10.

In this case, each of the unit blocks B2 and B3 is configured to have a resonant frequency in an infrared ray (IR) band, unlike the unit blocks having the resonant frequencies in the terahertz (THz) band used in FIGS. 8 and 9.

Referring to (a) of FIG. 10, it can be seen that the absorbance of the meta-structure of the present exemplary embodiment is exhibited high in the vicinity of 920 nm and 1,260 nm due to the influences of the unit blocks B2 and B3.

Further, the meta-structure exhibits the higher absorbance than the absorbance of the unit block B2 in the vicinity of 920 nm, so that it can be seen that the meta-structure of the present exemplary embodiment has the result of the improved absorbance by the mutual coupling between the continuously arranged unit blocks.

From now on, a device 1 using the meta-structure having the multifunctional properties of the present invention will be described. For the device 1 using the meta-structure having the multifunctional properties of the present invention, the same configuration as that of the meta-structure 10 having the multifunctional properties of the present invention is denoted by the same reference numeral and a description thereof will be omitted.

Figure 11:
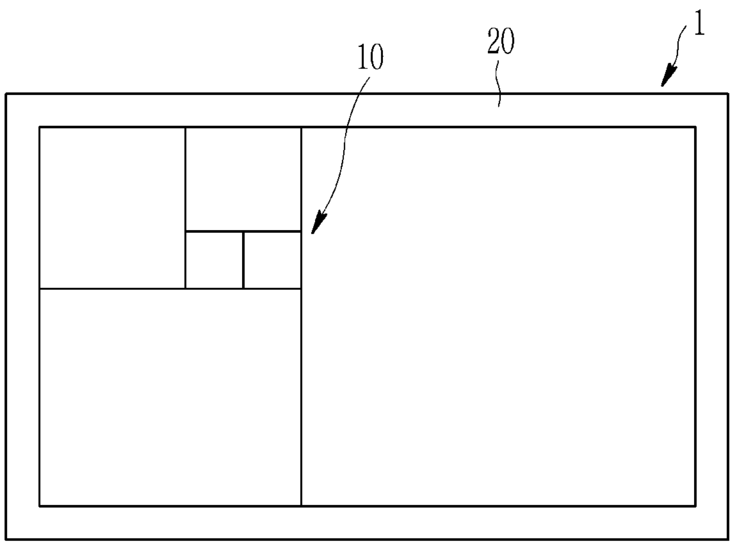
FIG. 11 is a diagram schematically illustrating a device using a meta-structure having multifunctional properties according to an exemplary embodiment of the present invention
Figure 12:
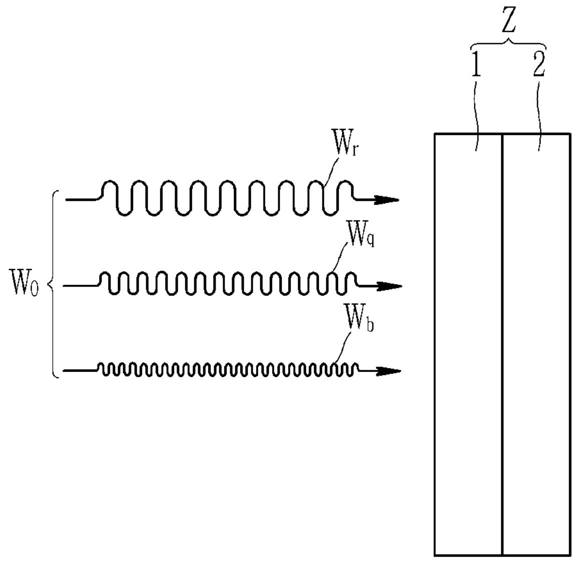
FIG. 12 is a diagram illustrating an example in which a device using the meta-structure having the multifunctional properties of FIG. 11 is applied to a polarizer.

FIG. 11 is a diagram schematically illustrating the device using the meta-structure having the multifunctional properties according to an exemplary embodiment of the present invention, and FIG. 12 is a diagram illustrating an example in which the device using the meta-structure having the multifunctional properties of FIG. 11 is applied to a polarizer.

Referring to FIGS. 11 and 12, the device includes the meta-structure 10 having the multifunctional properties, and a frame part 20 which is coupled to an edge of the meta-structure 10 having the multifunctional properties and fixes the meta-structure 10 having the multifunctional properties.

The shape fixing frame part 20 is a constituent element for simply fixing the shape of the meta-structure 10, and is not limited to the illustration drawn in the drawing, and may be variously modified according to a form of a target to which the shape fixing frame 20 is applied/mounted.

For example, the frame part 20 may also be formed of a base or a substrate combined to one surface of the meta-structure 10.

In the present exemplary embodiment, as the device 1 using the meta-structure 10 having the multifunctional properties, a polarizer Z used in a liquid crystal display device is described as an example.

The liquid crystal display device has a structure in which a liquid crystal is injected between glass plates forming a transparent electrode and the polarizer Z is disposed on one surface of the glass plate. Referring to FIG. 12, the polarizer Z consists of the device 1 using the meta-structure having the multifunctional properties which generates a difference in a refractive index for each of the R, G, and B frequency bands of white light $W_o$, and a polarizing film 2 which is attached to one surface of the device and absorbs light vibrating in any one direction and allows only the light vibrating in another direction to pass through to create linear polarized light.

R, G, and B light $W_r$, $W_g$, $W_b$ of which light characteristics are polarized by the polarizing film is controlled so as to have different transmission and reflection characteristics according to the difference in the refractive index controlled by the device 1 using the meta-structure having the multifunctional properties.

The meta-structure in the related art has only one property, so that the controllable frequency range of the wave W is relatively narrow. Accordingly, the white light $W_o$ in the specific frequency region may be controlled to have a desired negative refractive index, but the white light $W_o$ in other frequency regions is inevitably controlled to have a refractive index that is relatively larger or smaller than the desired negative refractive index. Accordingly, it is difficult to optimize the display of the white light $W_o$ in the liquid crystal display device.

In contrast to this, the device 1 using the meta-structure having the multifunctional properties of the present invention may control the refractive index of the white light $W_o$ in a relatively broad frequency band, so that it is possible to solve the problem in the related art.

Figure 13:
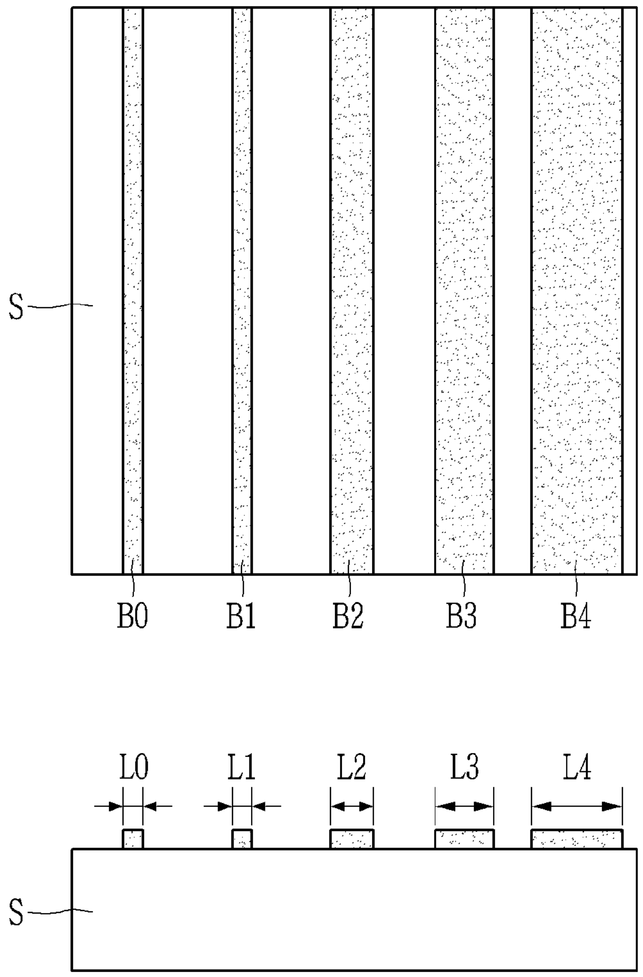
FIG. 13 is a diagram illustrating an example of a device using the meta-structure having multifunctional properties applied to a wire grid polarizer.
Figure 14:
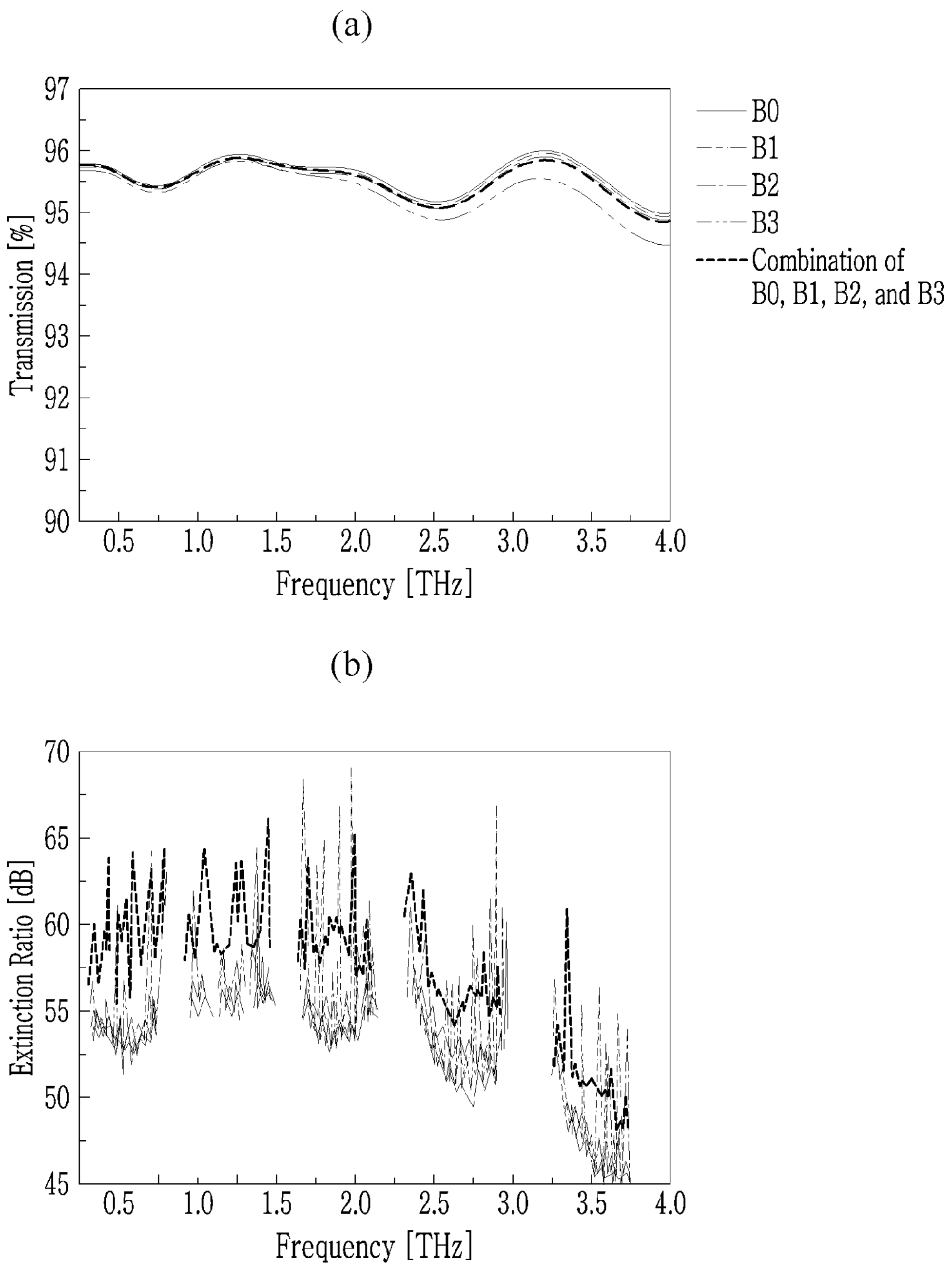
FIG. 14 is a graph illustrating a simulation calculation result of performance of the wire grid polarizer of FIG. 13.

FIG. 13 is a diagram illustrating an example of a device using a meta-structure having multifunctional properties applied to a wire grid polarizer, and FIG. 14 is a graph illustrating a simulation calculation result of performance of the wire grid polarizer of FIG. 13.

Referring to FIG. 13, the device using the meta-structure of the present exemplary embodiment is a wire grid polarizer, and each unit block is a wire.

In this case, widths of the unit blocks B0, B1, B2, B3, and B4 are L0, L1, L2, L3, and L4, respectively, and a ratio between the widths is continuously increased according to the Fibonacci Sequence rules.

The respective unit blocks B0, B1, B2, B3, and B4 are continuously arranged at the same interval on a flat substrate S functioning as the foregoing frame part 20.

The wire grid polarizer forms the device using the foregoing meta-structure, so that a spectrum corresponding to the polarizer of each unit block may be reinforced or offset by the coupling between the polarizers of the adjacent unit blocks.

(a) and (b) of FIG. 14 are simulation calculation results of transmission and an extinction ratio of the wire grid polarizer of FIG. 13, respectively.

For comparison, the structure in which one kind of unit blocks are continuously arranged is used.

The wire grid polarizer represents performance with transmission and an extinction ratio, and as transmission and an extinction ratio are high, performance is excellent.

Referring to (a) of FIG. 14, transmission of the wire grid polarizer of the present exemplary embodiment is lower by 0.2% than that of the structure in which the unit blocks B0 are continuously arranged or the structure in which the unit blocks B1 are continuously arranged, the wire grid polarizer of the present exemplary embodiment has the same performance as that of the structure in which the unit blocks B2 are continuously arranged, and transmission of the wire grid polarizer of the present exemplary embodiment is higher by 0.5% than that of the structure in which the unit blocks B3 are continuously arranged.

Referring to (b) of FIG. 14, an extinction ratio of the wire grid polarizer of the present exemplary embodiment is larger by about 5 dB than that of the structure in which only one kind of unit blocks are continuously arranged, so that it can be seen that the wire grid polarizer of the present exemplary embodiment has more excellent performance than that of the structure in which one kind of unit blocks are arranged.

The device using the meta-structure having the multifunctional properties of the present invention is not limited to the polarizer Z like the present exemplary embodiment, but may be applied to all of the devices requiring the control of a characteristic of a wave. Particularly, the device using the meta-structure having the multifunctional properties of the present invention is applicable to a sensor, a microscope, a current filter, a complex material, and the like.

In the meta-structure having the multifunctional properties of the present invention configured as described above, the unit blocks having different sizes according to the frequency region of the to-be-controlled wave are disposed on a plane or in a space, so that it is possible to obtain an effect of controlling waves of a broadband with the single meta-structure.

The meta-structure having the multifunctional properties of the present invention configured as described above may process the waves of the broadband by using the single meta-structure, so that it is possible to obtain advantageous effects, such as efficient blocking of electromagnetic waves harmful to a human body, multi-channel and high-speed data communication, and miniaturization of optical or current filters, and the meta-structure having the multifunctional properties of the present invention may also diversify the function of the meta-structure by controlling heterogeneous waves having different frequency bands.

Further, in the meta-structure having the multifunctional properties configured as described above, the unit blocks shaped like a square are arranged according to the Fibonacci Sequence rules, so that it is possible to minimize a size of the meta-structure by arranging the maximum number of unit blocks in a limited area, and it is possible to obtain an effect of stably enlarging the size of the meta-structure by combining the unit blocks, of which the square or cube shapes are enlarged in a predetermined magnification, in a spiral form.

Further, the device using the meta-structure having the multifunctional properties configured as described above is applied to a polarizer of a liquid crystal display device, so that it is possible to obtain an effect of optimizing the display of white light.

For another example, the meta-structure may be applied to a wire grid polarizer having high performance.

Further, the device using the meta-structure having multifunctional properties configured as described above has characteristics (resonance, absorption, reflection, and the like) in multiple bands, so that when a target material has multiple absorption, the device may precisely perform sensing by matching the multiple resonance of the meta-structure and the absorption of the target material.

Further, in the device using the meta-structure having multifunctional properties configured as described above, a detector may clearly detect resonance performance in each of the multiple bands as a signal, so that the device may be applied to a device having multiple signals.

The scope of the present invention is not limited to the exemplary embodiment and the modified example, but may be implemented in various forms of exemplary embodiment within the claims. Without departing from the gist of the present invention claimed in the claims, any person of ordinary skill in the art considers that up to various modifiable ranges are within the scope of the claims of the present invention.

DESCRIPTION OF SYMBOLS

1: Device using meta-structure having multifunctional properties
2: Polarizing film
10: Meta-structure having multifunctional properties
20: Shape fixing frame
B: Unit block
W: Wave
Z: Polarizer

The invention claimed is:

1. A meta-structure having multifunctional properties, wherein a plurality of unit blocks controlling a property of a wave is arranged on a plane or in a space in a predetermined pattern to form one structure, at least one of the plurality of unit blocks is formed to have a different size, and a frequency range of a wave controlled is changed according to the size of each of the plurality of unit blocks, wherein the plurality of unit blocks respectively have a length of one side increasing in a manner that the unit block with a longer length controls the wave with a lower frequency.

2. The meta-structure of claim 1, wherein:

the plurality of unit blocks is disposed on a plane, and the size of each of the plurality of unit blocks is continuously increased according to the Fibonacci Sequence rules.

3. The meta-structure of claim 1, wherein:
the plurality of unit blocks is disposed in a space,
each of the plurality of unit blocks is formed in a cuboid shape in which one surface is shaped like a square, and
the length of one side of each of the plurality of unit blocks is continuously increased according to the Fibonacci Sequence rules.

4. The meta-structure of claim 3, wherein:
the unit blocks are disposed so that one side of the $n^{th}$ unit block among the unit blocks is in contact with one side of the $n\text{-}1^{th}$ unit block.

5. The meta-structure of claim 1, wherein:
the plurality of unit block is disposed on a plane,
the size of each of the plurality of unit blocks is intermittently increased according to the Fibonacci Sequence rules.

6. The meta-structure of claim 1, wherein:
the plurality of unit blocks is disposed in a space,
each of the plurality of unit blocks is formed in a cuboid shape in which one surface is shaped like a square, and
the length of one side of each of the plurality of unit blocks is intermittently increased according to the Fibonacci Sequence rules.

7. The meta-structure of claim 1, wherein:
the wave is a electromagnetic wave.

8. The meta-structure of claim 1, wherein:
the wave is a mechanical wave.

9. A device using a meta-structure having multifunctional properties, the device comprising:
the meta-structure having the multifunctional properties of claim 1; and
a frame part coupled to meta-structure and configured to fix the meta-structure.

10. The meta-structure of claim 1, wherein:
each of the plurality of unit blocks has a resonant frequency, and
an overlapping phenomenon occurs between adjacent resonant frequencies from the plurality of unit blocks, so that a resonant frequency of the meta-structure has a broad band width.

11. The meta-structure of claim 1, wherein:
each of the plurality of unit blocks has a resonant frequency, and resonant frequencies of the plurality of unit blocks do not influence different frequencies, so that a resonance phenomenon occurs at various discrete frequencies.

* * * * *